United States Patent

Comerford et al.

Patent Number: 6,107,935
Date of Patent: Aug. 22, 2000

[54] SYSTEMS AND METHODS FOR ACCESS FILTERING EMPLOYING RELAXED RECOGNITION CONSTRAINTS

[75] Inventors: Liam David Comerford, Carmel, N.Y.; Stephane Herman Maes, Danbury, Conn.

[73] Assignee: International Business Machines Corporation, Armonk, N.Y.

[21] Appl. No.: 09/021,755

[22] Filed: Feb. 11, 1998

[51] Int. Cl.[7] ...................................................... G06F 7/04
[52] U.S. Cl. .............................. 340/825.31; 340/825.34; 704/246; 704/250; 704/273; 704/245; 382/115; 382/116; 382/117; 382/118
[58] Field of Search ........................ 340/825.31, 825.34; 704/246, 250, 273, 245; 367/197; 382/115, 116, 117, 118

[56] References Cited

U.S. PATENT DOCUMENTS 5,510,777  4/1996  Pilc et al. ............................ 340/825.31
5,897,606  4/1999  Kanevsky et al. ....................... 704/246

Primary Examiner—Brian Zimmerman
Assistant Examiner—Yves Dalencourt
Attorney, Agent, or Firm—F. Chau & Associates, LLP

[57] ABSTRACT

A speaker recognition system for selectively permitting access by a requesting speaker to one of a service and facility include an acoustic front-end for computing at least one feature vector from a speech utterance provided by the requesting speaker; a speaker dependent codebook store for pre-storing sets of acoustic features, in the form of codebooks, respectively corresponding to a pool of previously enrolled speakers; a speaker identifier/verifier module operatively coupled to the acoustic front-end, wherein: the speaker identifier/verifier module identifies, from identifying indicia provided by the requesting speaker, a previously enrolled speaker as a claimed speaker; further, the speaker identifier/verifier module associates, with the claimed speaker, first and second groups of previously enrolled speakers, the first group being defined as speakers whose codebooks are respectively acoustically similar to the claimed speaker (i.e., cohort set) and the second group being defined as speakers whose codebooks are acoustically similar to the claimed speaker but not as acoustically similar as the codebooks of the speakers in the first group (i.e., legion set); and still further, the speaker identifier/verifier module verifies the requesting speaker by comparing the at least one feature vector of the requesting speaker to the codebooks of the previously enrolled speakers in the second group and, in response to such comparison, generates an indicator indicating that the requesting speaker is one of verified and not verified for access to one of the service and facility.

39 Claims, 2 Drawing Sheets

SYSTEMS AND METHODS FOR ACCESS FILTERING EMPLOYING RELAXED RECOGNITION CONSTRAINTS

BACKGROUND OF THE INVENTION

The present invention relates to user recognition systems and methods and, more particularly, to systems and methods for access filtering employing relaxed recognition constraints.

It is known that user recognition systems are systems which employ recognition techniques in order to attempt to accurately identify and/or verify the identity of a particular user so that, for example, the user's request for access to a service and/or facility (or device) may be accepted or rejected based on the results of such identification/verification (recognition). Conventional user recognition systems try to equally minimize both a false acceptance rate and a false rejection rate. In other words, such systems typically aim at pushing down the control curve of the system in order to simultaneously reduce both false acceptance and false rejection. However, inevitably, the emphasis is systematically placed on substantially reducing the false acceptance rate, while maintaining an otherwise acceptable false rejection rate. This is typically the case with respect to security systems, for which prevention of non-authorized intrusions, i.e., false acceptances, is of paramount concern. That is, such systems tolerate false rejections, while attempting to permit no false acceptances.

One example of a user recognition technique is speaker recognition. Speaker recognition (identification/verification) can be done in text-dependent or text-prompted mode (where the text of an utterance is prompted by the speech recognizer and recognition depends on the accuracy of the words uttered as compared to the prompted text), or text-independent mode (where the utterances of the speaker are used to perform recognition by comparing the acoustic characteristics of the speaker with acoustic models of previously enrolled speakers, irrespective of the words uttered). Regardless of the mode employed, speaker recognition usually involves the comparison of the utterance with a claimed speaker model. A measure of the match between model and utterance is thereafter compared to a similar measure obtained over competing models, for instance, cohort or background models. Cohorts are composed of previously enrolled speakers who possess voice (acoustic) characteristics that are substantially similar, i.e., closest, to the speaker who tries to access the service and/or facility. Cohort models are the acoustic models built from acoustic features respectively associated with the cohort speakers. A background model is an average model built from acoustic features over the global population.

Accordingly, regardless of the user recognition technique employed and, with respect to speaker recognition, regardless of whether or not text-dependent, text-independent or any other type of speaker recognition is performed using cohort models, background models or the like, it would be desirable and highly advantageous to provide systems and methods for filtering access to a service/facility which substantially eliminate false rejections while providing a reasonable false acceptance rate.

SUMMARY OF THE INVENTION

It is an object of the present invention to provide systems and methods for performing user recognition (identification/verification) which substantially eliminates false rejections while providing a reasonable false acceptance rate.

It is another object of the present invention to provide systems and methods for performing user recognition (identification/verification) which include filtering of access to a service/facility such that authorized users substantially always receive access thereto, while unauthorized users have difficulties in accessing the service/facility.

It is a further object of the present invention to provide systems and methods for performing user recognition (identification/verification) which, in inverting the classical paradigm of user verification (i.e., from striving for no false acceptances and a reasonable amount of false rejections to no false rejections and a reasonable amount of false acceptances), provide substantial impediments to the perpetration of frauds on the service/facility.

It is yet another object of the present invention to provide systems and methods for selectively permitting access to a service/facility which substantially eliminates false rejection and which may use any type of user verification strategy including any type of speaker verification strategy.

In one aspect of the present invention, a user recognition system for selectively permitting access by a requesting user to a one of a service and facility comprises: means for extracting at least one biometric attribute from the requesting speaker; means for storing previously extracted biometric attributes respectively corresponding to a pool of previously enrolled users; means for identifying, from identifying indicia provided by the requesting user, a previously enrolled user as a claimed user; means for associating, with the claimed user, first and second groups of previously enrolled users, the first group being defined as users who are respectively biometrically similar to the claimed user with respect to the extracted biometric attribute and the second group being defined as users who are biometrically similar to the claimed user but not as biometrically similar as the users in the first group; and means for verifying the requesting user by comparing the extracted biometric attribute of the requesting user to the pre-stored biometric attributes of the previously enrolled users in the second group and, in response to such comparison, generating an indicator indicating that the requesting user is one of verified and not verified for access to one of the service and facility.

In another aspect of the present invention, a speaker recognition system for selectively permitting access by a requesting speaker to a one of a service and facility comprises: means for computing at least one feature vector (and, preferably, building an acoustic model therefrom) from a speech utterance provided by the requesting speaker; means for pre-storing sets of acoustic features (preferably acoustic models respectively built from the acoustic features) respectively corresponding to a pool of previously enrolled speakers; means for identifying, from identifying indicia (i.e., acoustic and/or non-acoustic indicia, as will be explained) provided by the requesting speaker, a previously enrolled speaker as a claimed speaker; means for associating, with the claimed speaker, first and second groups of previously enrolled speakers, the first group being defined as speakers who are respectively acoustically similar to the claimed speaker (i.e., cohort set) and the second group being defined as speakers who are acoustically similar to the claimed speaker but are not as acoustically similar as the speakers in the first group (i.e., legion set); and means for verifying the requesting speaker by comparing the at least one feature vector (preferably model) of the requesting speaker to the pre-stored acoustic features (preferably models) of the previously enrolled speakers in the second group and, in response to such comparison, generating an indicator indicating that the requesting speaker is one of verified and not verified for access to one of the service and facility.

In addition, a preferred speaker recognition system of the invention further includes means for decoding the speech utterance provided by the requesting speaker to generate a decoded request, as well as conditional access control means, responsive to the decoded request and the speaker verification indicator, for passing through the decoded request to another system responsive to the request, if the speaker is verified. Alternately, the conditional access control means may, itself, identify and execute the decoded request if the speaker is verified.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention introduces two unique concepts which are employed in the inventive systems and methods described herein. First, the invention provides for the inversion of the classical paradigm of user recognition. That is, the user identifier/verifier systems and methods of the invention strive for a zero percent false rejection rate and a reasonably small false acceptance rate. As mentioned, traditional systems are designed to eliminate false acceptances while maintaining low false rejections. The present invention defines such an inversion as user or access filtering. Secondly, the present invention introduces the concept of relaxed recognition constraints, as will be explained below. Two embodiments will be described which are illustrative of the concepts of the present invention as taught herein.

It is to be appreciated that the two illustrative embodiments to be described below involve speaker recognition. In such a context, the inversion of the security paradigm is referred to as speaker filtering and the relaxed recognition constraints as speaker legions. However, it is to be understood that other biometric attributes may be extracted and used, in place of speech and voiceprints, to perform user recognition in accordance with the present invention, e.g., facial feature recognition, handwriting recognition, retina recognition, etc. Such recitation of biometric attributes employed to recognize a user is illustrative in nature and is not intended to be exhaustive.

Figure 1:
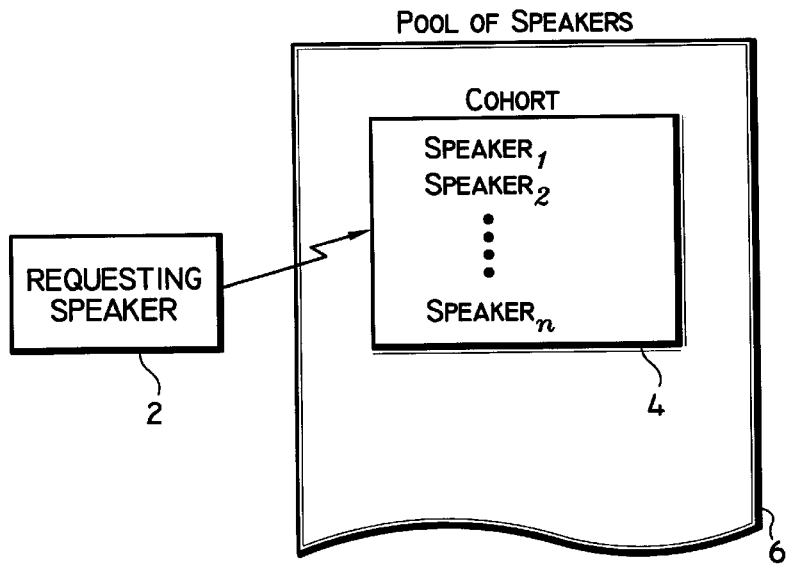
FIG. 1 is a block diagram of a speaker pool illustrating the concept of a speaker cohort.

Referring to FIG. 1, a block diagram is shown of a typical pool (database) of speakers used to perform speaker recognition on speakers, for example, attempting to access a particular service/facility. For each speaker attempting access (requesting speaker 2), it is common to define a set 4 of statistically similar speakers from the pool 6. This set 4 is called the cohort. Specifically, the pool of speakers is a population of previously enrolled speakers for which acoustic characteristics have been extracted from the recitation of training data by the speakers from which acoustic models are generated and stored for association with each speaker. When a new speaker enrolls in the speaker pool, his enrollment (training) data is compared with acoustic models stored for all the speakers in the database. A measure (score) of the match between the new speakers' data and each speaker in the database is produced and the various speakers in the database are ranked according to the respective measure. The speakers having the top N scores associated therewith with respect to comparison with the new speaker are referred to as the cohort set of that new speaker. The cohort and related cohort models of the newly enrolled speaker are stored in the database in association with the newly enrolled speaker and his acoustic model.

As mentioned above, traditional speaker recognition using open sets of speakers or clustering from a pool, use the acoustic models respectively associated with each speaker of the cohort set 4 (speaker$_1$, speaker$_2$ . . . speaker$_N$) as competing models during real-time verification. This typically occurs in the following manner. First, an identification claim is made whereby the acoustic characteristics extracted from the requesting speaker's utterances (testing data) are compared to the previously enrolled speaker models (or subsets thereof in the case where the pool is set up in a hierarchal tree arrangement, as is known) in order to identify a previously enrolled speaker model as a "claimed speaker" model. A best match to the testing data among the previously enrolled speaker models is determined by comparing measures (scores), such as, for example, distance measures, calculated from respective comparisons of the testing data to the previously enrolled acoustic models, as is known in the art. Examples of such measures are given below, although the particular type of measure is not critical to the invention.

It is to be appreciated that the identity claim may also be made, for example, by the requesting speaker providing a name or some other non-acoustic identifying indicia (e.g., personal identification number) which is compared to similar non-acoustic identifying indicia associated with each speaker in the database and thus used to initially identify a claimed speaker and the associated acoustic model from the pre-stored database. A measure is then similarly calculated with respect to the requesting speakers testing data and the claimed speaker model.

Nonetheless, the real-time testing data associated with the speaker's utterances is then compared to the cohort models associated with the claimed speaker model and similar measures are determined, as mentioned above. The measures calculated by comparison to the competing cohort models are compared to the measure calculated when identifying a claimed speaker and, if none of the competing measures are better (e.g., closer) to the speaker's testing data, then the speaker is identified as the claimed speaker and thus considered to be verified (i.e., accepted). However, if one of the competing measures from the cohorts is closer to the speaker's testing data, then the speaker is not considered to be verified (i.e., rejected). Thus, since verification is required to permit access to the service/facility, a requesting speaker who is not verified when compared to the cohorts of the claimed speaker is not permitted access. Such a conventional approach to speaker identification/verification using cohort models as competing models establishes a system which comports with the above-mentioned classical security paradigm of striving for zero false acceptances while tolerating false rejections.

Figure 2:
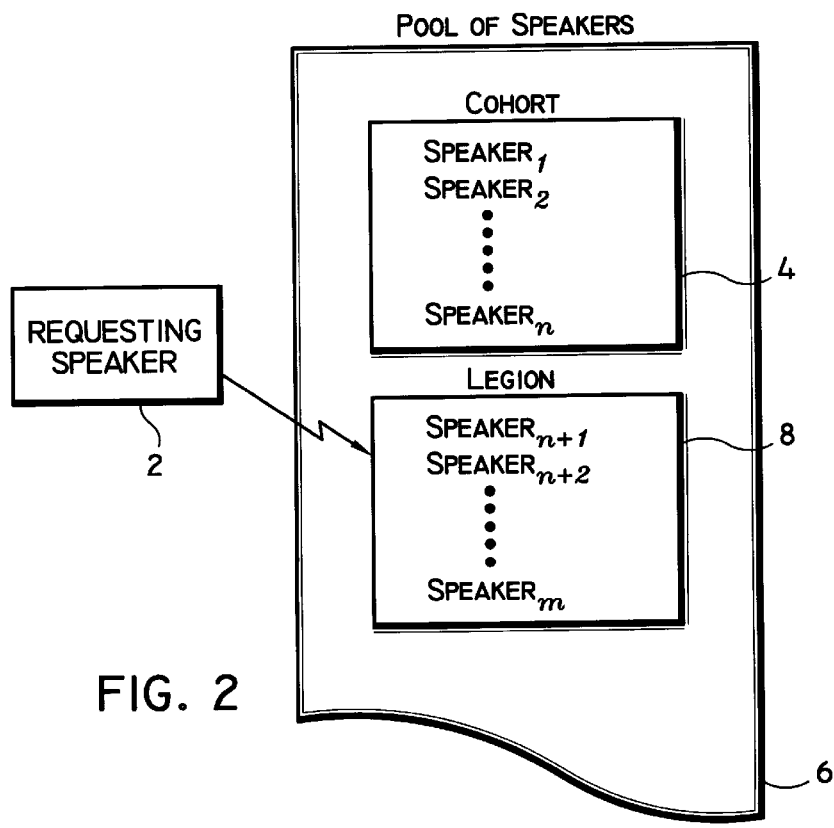
FIG. 2 is a block diagram of a speaker pool illustrating the concept of a speaker legion according to the invention.

Referring now to FIG. 2, a block diagram depicting a speaker legion formed in accordance with the present invention is shown. Advantageously, as will be explained, the present invention employs legion models, that is, acoustic models respectively associated with the speaker legion, as the competing models for speaker verification. A legion associated with a requesting speaker is defined, in accordance with the present invention, as a subset of speakers from the speaker pool who are statistically similar to the claimed speaker but do not belong to the cohort set of the claimed speaker. Specifically, as shown in FIG. 2, a set 8 contains the speaker legion (e.g., speakerN+1, . . . speaker$_M$). Such speaker legion includes speakers from the pool 6 who are statistically close to the claimed speaker but do not belong to the cohort set of the claimed speaker. Therefore, the legion models are the acoustic models respectively associated with these legion speakers in set 8.

It is to be appreciated, as will be explained, that the legion models may be built in several advantageous ways. For example, the legion model may be "speaker driven" whereby they are built directly from all the training data of the legion speakers. Alternatively, the legion models may be "data driven" wherein the models are built using only appropriate data from the entire pool of speakers. That is, all data from the pool minus the data of the cohort speakers is used to build a background model. Further, the legion models may be formed using an unconstrained cohort approach and/or a modified threshold approach. These approaches and concepts will be explained below.

In this manner, a speaker recognition system and method of the invention, utilizing legion models as the competing models in the verification process, provide substantially zero false rejections and a reasonable number of false acceptances.

Thus, during enrollment of a new speaker into a speaker pool formed according to the invention, not only is a cohort set (e.g., 1 to N statistically closest speakers where N may equal, for instance, 16) identified and stored in association with each newly enrolled speaker but, in addition, a legion set (e.g., N+1 to M closest speakers where M may equal, for instance, about 32) is identified and stored in association with each newly enrolled speaker.

Furthermore, during real-time verification according to the invention, after an identity claim has been made in a manner, for example, as described above (e.g., comparison between the requesting speaker's testing data and models in the pool, provision of a password or PIN, etc.) and the best measure (score) associated with such identity claim is determined in identifying the claimed speaker, the real-time testing data associated with the speaker's utterances is then compared to the legion models associated with the claimed speaker model. Similarly, as mentioned above, associated measures are determined from these comparisons. Accordingly, if the measure which is calculated from the comparison of the requesting speaker's testing data and the claimed speaker model is better (e.g., closer) than the competing measures with respect to the legion models, then the requesting speaker is verified. However, if one of the competing measures is better than the testing data/claimed speaker model measure, then the requesting speaker is not verified.

Again, since verification is required to permit access to the service/facility, a requesting speaker who is not verified when compared to the legion speakers of the claimed speaker is not permitted access. However, given the fact that the legion models are used as competing models in the verification procedure rather than the cohort models, the matching constraints that the requesting speaker must satisfy are relaxed. That is, it is less likely that a better match than the claimed speaker will be found when compared to the legion speakers. As a result, speaker identification/verification using legion models as competing models establishes an inventive approach which inverts the classical security paradigm of striving for zero false acceptances and tolerating false rejections. Thus, speaker recognition is performed which substantially eliminates false rejections while providing a reasonable false acceptance rate.

It is to be appreciated that the present invention provides alternative constructions of legion models for inverting the classical paradigm of speaker recognition. For instance, as mentioned, background models are average models built over a global population, e.g., a speaker pool. However, in accordance with the concept of relaxed verification constraints, the present invention provides for a background model which, rather than being built on the whole population of a speaker pool, is built on the whole population minus the subject cohort set.

Further, the concept of unconstrained cohort sets may be employed to provide relaxed verification constraints in accordance with the present invention. As mentioned above regarding enrollment, cohort sets are formed and stored during enrollment for each speaker based on the training data uttered while enrolling; however, in accordance with the present invention, cohort and legion sets may be formed each time a speaker requests access to the service/facility (i.e., in real-time). In this way, testing data is employed to form the cohort and legion sets rather than training data.

Still further, it is known that in text-dependent or text-prompted speaker recognition systems, a single fixed threshold is usually employed for making both identification and verification determinations. However, the present invention uniquely provides for employing a more relaxed verification threshold in the speaker enrollment phase. In such an embodiment, the verification threshold is selected so that the enrolling speaker, as well as most of the cohort speakers, are accepted while speakers in the legion are rejected. In such cases, the cohort is preferably restricted to a small value, e.g., N=4 or 8.

It should be understood regardless of which of the inventive approaches to competing models is employed, the speaker legions are still defined in the same manner as described above.

It is to be appreciated that given the unique concepts described above, a variety of speaker recognition system architectures may be employed to implement the present invention. By way of example and not intended to be an exhaustive list, such approaches which may be employed include a frame-by-frame feature classification (text independent, small utterances, fast match) architecture (as will be explained below), a speaker-dependent model based decoder (accurate, longer utterances, detailed match) architecture and a hybrid (fast and detailed match, hierarchical implementation) architecture. The latter two approaches are described in U.S Ser. No. 08/851,982 filed on May 6, 1997, attorney docket no. Y0996-189, entitled "Speaker Recognition Over Large Populations With Fast And Detailed Matches", the disclosure of which is incorporated herein by reference. This application describes how to handle a very large population of speakers. The approach is to utilize a frame by frame classifier to perform a fast match whereby a set of speakers close to the testing data is quickly extracted in order to reduce the size of the population to be considered. The second step is to form a detailed match which involves the use of HMM (Hidden Markov Models) models trained on each of the speakers. Such models used in the detailed match are therefore more detailed and present a better discriminative power. These models are used to make a decision among a set of confusable speakers.

A text-independent verifier based on frame-by-frame feature classification will be described herein to exemplify the teachings of the present invention. A frame-by-frame feature classification text-independent verifier employing cohort models as competing models is described in U.S. Ser. No. 08/788,471, filed on Jan. 28, 1997, and entitled: "Text Independent Speaker Recognition For Transparent Command Ambiguity Resolution And Continuous Access Control", the disclosure of which is incorporated herein by reference.

As explained in the above-incorporated reference U.S. Ser. No. 08/788,471, text-independent speaker recognition is preferred over text-dependent or text-prompted speaker recognition because text independence allows the speaker recognition function to be carried out in parallel with other speech recognition-based functions in a manner transparent to a user and for a plurality of concurrent users at differing access levels without requiring interruption for new commands or identification of a system user whenever a new user is encountered.

Figure 3:
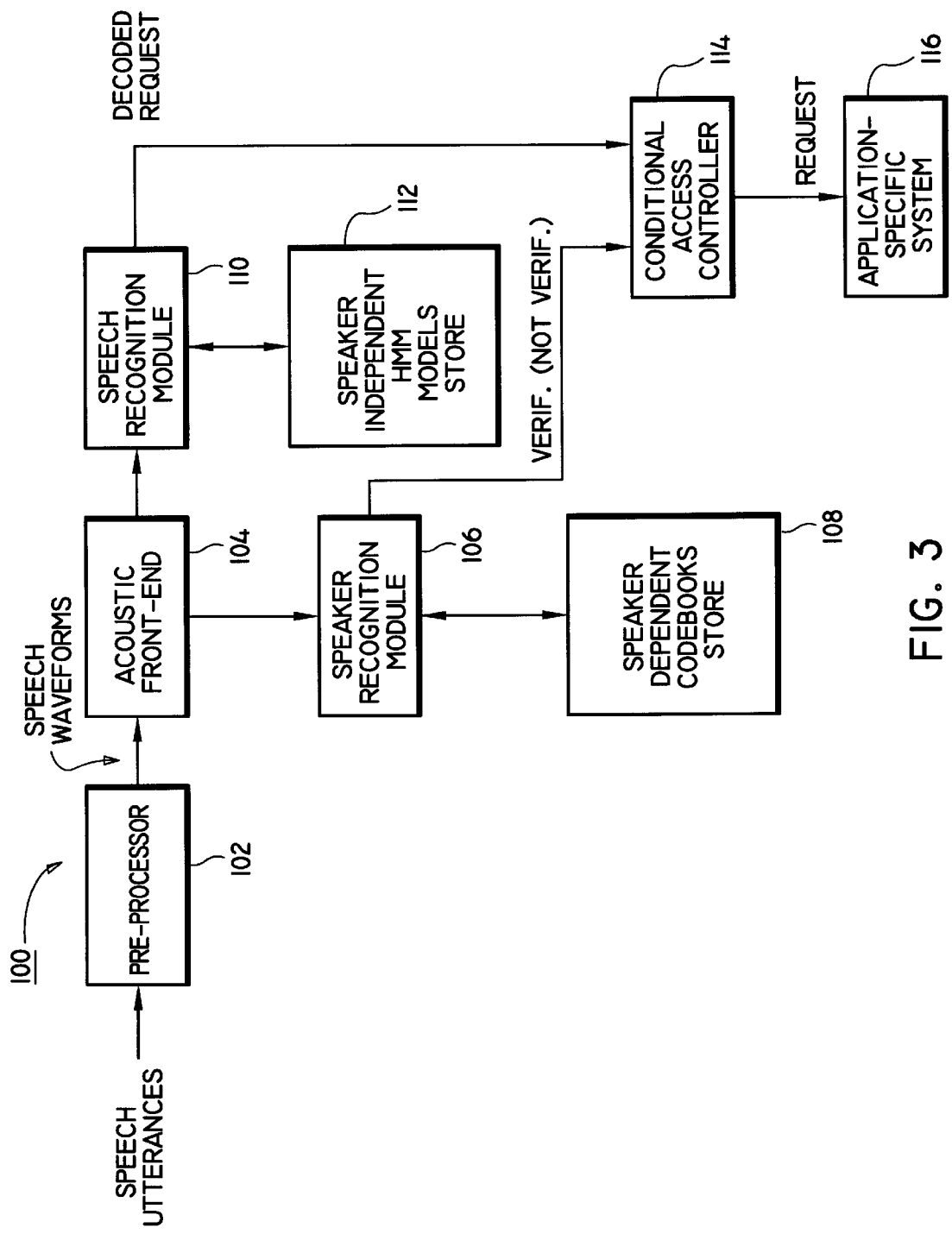
FIG. 3 is a block/flow diagram of one preferred embodiment of a speaker recognition system according to the invention.

Referring now to FIG. 3, there is shown a block/flow diagram of a preferred form of the invention particularly adapted to provide access filtering in accordance with the invention in the context of frame-by-frame feature classification text-independent verification. It is to be appreciated that the present invention is usable with any speech recognition system and is not, in any way, limited to use with or dependent on any details or methodologies of any particular speech recognition arrangement with which the invention may be employed. For instance, even a generalized speech recognition system such as the commercially available large vocabulary IBM ViaVoice Gold system may be adapted to perform recognition functions in accordance with the invention. It should be further understood that the preferred embodiment exemplified in FIG. 3 is considered both a block diagram of apparatus for carrying out the invention as well as a flow chart. Thus, it should be understood that the elements illustrated in FIG. 3 may be implemented in various forms of hardware, software, or combinations thereof. Preferably, the main recognition elements are implemented in software on one or more appropriately programmed general purpose digital computers, each having a processor, associated memory and input/output interfaces for executing the elements of the invention. As a result, FIG. 3 may be considered to include a suitable and preferred processor architecture for practicing the invention which may be achieved by programming one or more of the general purpose processors. Of course, special purpose processors may be employed to implement the invention. Given the teachings of the invention provided herein, one of ordinary skill in the related art will be able to contemplate these and similar implementations of the elements of the invention.

Specifically, FIG. 3 illustrates a block/flow diagram of a text-independent speaker recognition system 100. The system 100 includes: a speech utterance pre-processor 102; an acoustic front-end 104 operatively coupled to the pre-processor 102; a speaker recognition module 106 operatively coupled to the front-end 104; a speaker dependent codebooks store 108 operatively coupled to the module 106; a speech recognition module 110 operatively coupled to the front-end 104; a speaker independent HMM (Hidden Markov Model) models store 112 operatively coupled to the module 110; and a conditional access controller 114 operatively coupled to the module 106 and the module 110.

The speech utterance pre-processor 102 receives the speech uttered by a speaker and generates representative speech waveforms. The speech utterance pre-processor 102 may include an audio-to-analog transducer (microphone) and an analog-to-digital converter which respectively transduce the utterances into an electrical signal and then convert the electrical signal into a digital signal representative of the speech uttered. Further, the pre-processor may preferably sample the speech signal and partition the signal into overlapping frames so that each frame is discretely processed by the remainder of the system. The output signal of the pre-processor 102 is the sampled speech waveforms which are provided to an acoustic front-end 104. Alternatively, the acoustic front-end 104 may perform the functions of the pre-processor 102.

The acoustic front-end 104 receives the speech waveforms and, as is known in the art, generates feature vectors (signals) therefrom. Physiologically related mel cepstra, delta and delta-delta feature vectors are preferred for efficiency and effectiveness of speaker identification and verification although other known feature vectors may be used. In any case, the development of such feature vectors from an input signal is purely a function of the speech recognizer and need not be separately provided for speaker recognition in accordance with the present invention and it is convenient and preferred to utilize feature vectors which are available although feature vectors may also be separately derived in the practice of the present invention.

Next, the speaker recognition module 106 uses the feature vectors provided by the acoustic front-end 104 to perform the speaker recognition functions of the present invention. The speaker recognition module 106 and the speech dependent codebooks store 108 form a vector quantizer decoder in which the requesting speaker is compared to certain speakers from a previously enrolled speaker pool (store 108). It is to be appreciated that a minimum of information specific to the voice of an enrolled speaker is provided in the codebooks stored in the store 108. The voice information is preferably in the form of a set of about sixty-five (65) clustered feature vectors and means, variances and scores associated therewith which are captured under the control of the speaker recognition processor 106 as each new speaker is enrolled.

It is to be understood, however, that 65 codewords per codebook is not critical and thus, for example, if only about 1 to 2 seconds of speech are available (rather than about 5 to 10 seconds), then codebooks having only about 10 to 20 codewords may be employed.

As the speaker is recognized, feedback of the recognition information may be given to the user through any convenient device (not shown) such as a display, indicator, annunciator or printer. The user may correct the result of the speaker recognition by indicating that the recognition is incorrect or by indicating (e.g., by marking a menu on a display) that he or she is a new user who requires enrollment in the event that the new user has been incorrectly recognized as a previously enrolled user. At the same time, the speaker may enroll specific commands, preferences and other speaker-specific information (referred to as aliases) to be uniquely associated with the speaker. For instance, in a voice dialing implementation of the invention as will be described below, a user may enroll the names of persons whom he wishes to be automatically dialed upon his voice command.

Typically, about ten seconds of speech which generally includes a list of words containing a variety of speech formants are sufficient for capture of the feature vectors, means, variances and scores for a codebook and enrollment of a speaker. But, as mentioned, more or less time durations of speech may be employed. Since these feature vectors and variances are captured during enrollment which is specific to a single speaker, the codebooks corresponding to other enrolled speakers are not affected. It is to be understood that these feature vectors, variances and scores are specific to individual enrolled speakers and, while derived from enrolling text, are independent of any feature vectors which might exist in the overall system which are associated with any particular command (e.g., name of party to be automatically dialed). Thus, as desired in a preferred embodiment of the speaker recognition system of the present invention, the speaker recognition process is completely independent of speech or command recognition. However, as previously mentioned, text independence is not critical to the use of speaker legions and legion models formed according to the present invention.

According to the frame-by-frame feature classification text-independent verifier approach shown in FIG. 3, speaker identification/verification is performed by the vector quantizer decoder formed by the speaker recognition module 106 and the store 108. As mentioned above, each previously enrolled speaker is characterized by a codebook of about 65 codewords. As is known, each codeword is characterized by means, variance and scores. A distance between codewords is defined as the average symmetric minimal distance between the codewords of each codebook. As is known, distances between codebooks may be computed as vectorial Kullback Liebler distances as disclosed in the text by T. M. Cover and J. A. Thomas, "Elements of Information Theory" Wiley & Sons, New York (1991). By ranking the distance of the previously enrolled speakers relative to the access requesting speaker to identify the claimed speaker (which may be done, as mentioned above, using acoustic or other non-acoustic indicia), the different cohort sets (corresponding to different maximum distances imposed to define the cohort) and the different legion sets may be readily determined. It is to be appreciated that the distance measure (score) between codewords of codebooks may be done by sorting a matching score from the different models on the enrolling data. This may be done by accumulating votes as is described in U.S. Ser. No. 08/787,031 (attorney docket no. Y0996-018) entitled "Speaker Classification for Mixture Restriction and Speaker Class Adaptation", the disclosure of which is incorporated herein by reference. This application discloses how it is possible to use the training data to build a tree of speakers wherein the speakers are clusters according to the similarity of the training data. Accordingly, it is to be appreciated that in accordance with the present invention, such a tree structure can be used to define the cohort (a set of speakers clustered with the claimed speaker at a given level) and the legion (the set of speakers clustered with the claimed speaker at a higher level minus the cohort).

Also, the measure may be accomplished by measuring a likelihood on the mixtures of Gaussians associated to each model or cross entropy (Kullback Liebler, as mentioned above) between the mixtures of Gaussians. It is to be understood that the manner with which matches (via distance measures) between the requesting speaker's model and the competing models are determined is not critical to the invention and, thus, the description above concerning various measures is merely exemplary and not an exhaustive list. One of ordinary skill in the art will contemplate other ways to compute such measures (scores) between models.

Furthermore, it is to be appreciated that rather than the previously enrolled speakers being characterized by codebooks, they may be alternatively characterized by Hidden Markov Models (HMM), dynamic time warping, or other known acoustic modeling techniques.

As previously explained, the legion is defined as the subset of speakers from the previously enrolled speaker pool (stored in store 108) who are statistically similar to the claimed speaker but do not belong to the cohort of the claimed speaker. As a result, the codebooks (i.e., models) associated with the legion speakers are used as the competing codebooks with which the determination to provide the requester access to the service/facility is based and, therefore, by loosening the constraints on identification/verification (by using the legion models instead of the cohort models), the speaker recognition system 100 provides substantially no false rejections (denying access to authorized users) and a reasonable rate of false acceptances (permitting access to unauthorized users). Thus, the output signal provided by the speaker recognition module 106 is indicative of whether the speaker has been sufficiently verified, the sufficiency being based on comparisons of how close (distance) the requesting speaker's testing data is to the competing codebooks of the legion speakers. If the testing data is not closer to any of the legion speaker models than to the claimed speaker model, then the requester is considered verified, but if the testing data is closer to a legion speaker model, then the requester is considered not verified.

Accordingly, the remainder of the speaker recognition system 100 operates as follows. Simultaneous with the operation of the speaker recognition module 106, the actual request made by the speaker, in the form of feature vectors provided by acoustic front-end 104, is decoded by the speech recognition module 110 in conjunction with the speaker independent HMM models store 112. As mentioned, the speech recognizer and speaker independent HMM models store may be part of any conventional speech recognition system (e.g., IBM ViaVoice Gold system). In any case, the decoded request, which may include for example a command, is provided to the conditional access controller 114 along with the result (i.e., speaker verification or no speaker verification) from speaker recognition module 106. Basically, the conditional access controller 114 correlates authorization (speaker verification) with commands (requests made by speaker). That is, whenever a command is issued, the system identifies and verifies the user to ascertain that the speaker/user is authorized to issue that command or, more generally, to use the system. In this preferred embodiment, the result of speaker verification is directly provided to the conditional access controller 114 which stores authorized commands for each enrolled user, preferably, in the form of a look-up table accessible by speaker verification information. If a speaker is verified and a corresponding list of authorized commands is provided, the recognized command (from recognizer 110) may simply be compared against the list before the command is issued. The authorized command may then be provided to an application-specific system 116 which then executes the command. Some examples of application-specific embodiments employing the advantageous concepts of the present invention will be given below.

Given the inventive teachings explained in detail herein, one of ordinary skill in the art will appreciate a large variety of applications for implementing the present invention. By way of example, two applications of the invention will be described below; however, it is to be understood that use of the invention is not limited to such applications. In fact, a speaker recognition system formed in accordance with the present invention may advantageously be used whenever an application preferably requires: deterrence of fraudulent use of a service/facility at low cost, substantially no false rejections, and false acceptances are not catastrophic.

In reading each of the following embodiments, it should be clear to those of ordinary skill in the art that combinations of means to verify identity and authorization may be made. Elements such as passwords, hardware keys of both electronic and mechanical forms, and other "biometric" methods are widely known.

As a first application, a speaker recognition system which provides access filtering based on relaxed model comparisons, i.e., employing speaker legions, may serve to deter abuse of a corporate voice dialing system. As is known, in conventional corporate voice dialing systems, the user calls a server, speaks the name of the employee that he wishes to call, and the system recognizes the name and automatically dials the telephone number associated with that particular employee. Unfortunately, such conventional systems may be abused. For instance, assume the server may be reached with a toll free number, then friends and family of an authorized system user located abroad or in the toll area code may call the server to reach the employee without incurring any cost themselves. Implementation of speaker recognition according to the invention in the voice dialing system prevents such abuse from occurring.

First, each voice dialing system user (e.g., employee) must enroll his or her voice with the system. With reference to particular elements in FIG. 3, this may be accomplished, as explained above, by the speaker recognition module 106 creating a codebook for each enrolled employee, which is stored in the speaker dependent codebook store 108. Later, when calling the voice dialer, the employee must dial some ID number (e.g. employee serial number) which serves to establish him as the claimed speaker. Alternatively, the user can state his name, whereby the user's name is decoded to determine the identity claim. The identity claim may also be provided in other ways. For instance, the claim could be established from the automatic number identification (ANI) of the phone used by the requester, or an ID number of a cellular phone, or a list of phones and extensions from where the requester may call. As will be explained, the name dialer may be employed twice; first to state the name (and possibly location) of requester and, second, to state name (and possibly location) of the person to be dialed. The name of the requester is decoded as the identity claim and the second name is decoded as the request.

Regardless of the manner in which the identity claim is made, the employee speaks the name of the person he wishes to call. The utterance, which represents the name request, is verified by the speaker recognition module 106 in accordance with the codebooks of the speaker legion determined from the pool of previously enrolled employees. If the employee is verified as being authorized to use the voice dialing system (i.e., the distance score determined for the claimed speaker is better than the scores relating to the competing models of the legion speakers), the speaker recognition module indicates that verification is successful (e.g., a positive verification signal is sent to the controller 114), if not, an unsuccessful verification is indicated (e.g., a negative verification signal is sent to the controller 114). Also, in striving to achieve a zero false rejection rate, the system may provide the user with the telephone number of the person he is trying to reach, in the event that the user is not successfully verified. As such, the user may still reach the party by manually dialing the telephone number indicated by the system.

Concurrently, the actual name request uttered is decoded by the speech recognizer 110 according to the HMM models stored in store 112. The decoded name of the party to be called and the result of the speaker recognition are provided to the conditional access controller 114. The controller 114 may contain the list of callers, and their telephone numbers, whom the employee has previously enrolled and identified as callers he wishes to be able to automatically dial through the system. When the requesting speaker is successfully verified, and the decoded name is found on the list, the call is placed. However, when the requesting speaker is not verified, the name and number that he attempted to call is flagged and saved, but not placed. As mentioned above, the user may be given the telephone number of the party he was attempting to reach. Nonetheless, a record of unsuccessful calls (e.g., unauthorized calls) may be kept for future reference. Further, the controller 114 may alternatively function as a logical AND gate in that the decoded request is passed on to another system (which is responsive to the request), e.g., system 116, only if the requesting speaker is verified by the speaker recognition module. It is also contemplated that if verification is unsuccessful, the requester is still permitted to state or dial a password to have the telephone number dialed anyway.

As a second application, a speaker recognition system which provides access filtering based on relaxed model comparisons, i.e., employing speaker legions, may serve to deter unauthorized copying and/or installing of applications software programs. As is known with respect to commercial off-the-shelf software applications programs, a buyer of the software package typically purchases a license to use the software program on one or more personal-type computers. However, as is also known, most such software programs do not have measures for preventing unauthorized copying, installing or execution of the program. Implementation of speaker recognition according to the invention with respect to software program copying, installing or execution prevents such unauthorized activity from occurring.

When a user acquires and installs a software package on his computer, the installation process may preferably include a speaker enrollment phase. Similarly, the execution of the application may be preceded by an authorization phase. Again, with reference to particular elements in FIG. 3, this may be accomplished by the speaker recognition module 106 creating a codebook (or some other acoustic model) for the installer or authorized user, which is stored in the speaker dependent codebook store 108. A diskette or compact disc (CD) on which the purchased software application program resides may serve as the store 108 whereby the models are written to the diskette or CD (i.e., re-writable CD). Alternatively, a separate diskette or re-writable CD may be provided, in addition to the diskette or CD on which the application program resides, in order to store the acoustic models. Alternatively, space for storage of language models may be reserved in the executable form of either the installer program or the application program or both. The models may also be remotely stored on a network server such as a web server (i.e., computer), whereby they can be retrieved later on when another installation is attempted. It should be clear that the vested interests of the software manufacture make it desirable to store these models on a server under the control of that manufacturer. Widespread use of the internet and the intranet make this approach convenient and offer the opportunity for usage-count software billing.

Whenever a new installation or a new instance of execution is attempted, the user is prompted to speak to the system, for example, the user may be prompted to issue the command "install software" or "authorize my use". In a preferred embodiment, program data areas, the diskette (CD or web server) or, more specifically, a file stored thereon, is referenced to determine whether any previously stored acoustic models exist, that is, whether the application software was previously installed. If not, the user's voiceprint (acoustic model) is generated from the sample utterance he provides to the system and stored in the installed image's data areas or on the diskette (CD or web server). Preferably, the voiceprint is stored in a file in an encrypted form. After this initial acoustic enrollment, the user is permitted to proceed with the normal installation of the application program on his computer. Similarly, if these files or data areas are filled in, they may be referenced prior to execution of the program to establish the authorization status of the user.

Subsequently, the next time a person (whether the original installer or not) attempts to install that particular software application program from its original installation diskette, or execute an installed instance, a voice sample of the subsequent installer is extracted at the time of the attempted re-installation or execution and matched to competing models associated with the system. The competing models may be a set of models previously loaded (stored) on the diskette which form the background population. Preferably, the model built for the speaker from his voice sample competes with the models associated with an identified legion. It is to be appreciated that the legion and cohort sets may be previously generated from a pool of speakers and stored on the diskette so that they are present at the time the purchaser first acquires the software application package. Alternatively, the legion and cohort sets may be generated at the time of the installation from the actual test data provided by the installer (i.e., unconstrained cohorts).

Further, the identity claim serves to only select a sub-set of these models to use as a legion. Similarly, in a modified threshold-based approach, as mentioned above, the appropriate threshold values (i.e., for identification and verification) could be transmitted from, for instance, the web site and used by the system to perform speaker recognition in accordance with the invention.

Accordingly, if the installer (speaker) is verified and the command (e.g., "install software" or "authorize my use") is successfully decoded by the speech recognizer 110, the conditional controller 114 permits the installation or application execution to continue, i.e., permits the installation portion of the software application program (e.g., system 116) to proceed with normal installation operations. If the installer is not verified, the conditional controller 114 does not permit installation to continue. Similarly, if the user is not verified, the conditional controller 114 does not permit execution to continue. If this would-be installer or user were actually a person authorized to install or use the software, absent the inversion of the classical security paradigm by the present invention, the person would have to contact the software manufacturer. However, by relaxing the constraints of the voice characteristic comparisons by employing the concept of speaker legions according to the present invention, such inconvenience to the purchaser will almost never occur. Further, if the models are stored by the software on a web site, the first use of the re-installed software requires Internet access and, thus, the same procedure as described above would follow with the additional step of downloading the models from the web site. If no access is possible from the particular computer on which the software package is to be installed, the user can download the models on a diskette or obtain the diskette from the software manufacturer (operating the web site). Preferably, this diskette contains encrypted versions of the models. The software program may then decrypt and read the models and perform verification, as previously described. In the case that these models are stored in the data areas of the program itself, the program may be freely copied but remains useful only to the authorized user.

The above-described use of relaxed recognition constraints in prevention of unauthorized installation may also be extended to prevent unauthorized copying of software. That is, the same speaker recognition procedure would be performed before permitting a person to copy software from a diskette or some other storage medium.

Still further, it is to be appreciated that the use of speaker recognition to prevent unauthorized installation, copying or execution of software may be realized without the use of relaxed recognition constraints. That is, in higher security applications where false acceptances are not permitted and false rejections are tolerable, cohort models may be used as competing models. In fact, any other type of biometric extraction and comparison may be implemented in place of voiceprint recognition, e.g., face recognition. Further, non-biometric attribute comparison may be employed in addition to, or in place of, biometric attribute extraction and comparison, e.g., passwords and PINs. Still further, comparison of a software registration number may be used with any of the previously-mentioned embodiments to provide further security measures. In such case, the user would be prompted to provide, either verbally or by keystrokes, the registration number that was originally provided with the software package so that it could be compared for accuracy with the registration number stored on the diskette.

In yet another application employing access filtering based on relaxed model comparisons in accordance with the present invention, low security encryption of computer files may be performed. That is, as a direct extension of the concepts described above, encrypted computer files may be decrypted only if the voice of the person requesting decryption of the files is first verified. In still a further application and also a direct extension of the above concepts, a computer display screen locking system in a low security environment may be employed. For instance, the screen saver employed for use with a display of a computer will typically "lock" the screen. However, in accordance with the present invention, based on about 1 or 2 seconds of voice from a requesting user, the screen may be unlocked if the requesting user is properly verified. Accordingly, in low security cases, these applications will simply make it difficult for the non-authorized user to accomplish his desired action (e.g., decryption of files or unlocking a screen saver). However, it will not impose a hard verification. Nonetheless, in both cases, hard verification can easily be achieved by conventional speaker verification (e.g., using cohort sets as competing models). However, one of the important concepts in accordance with the present invention is the inversion of the classical security paradigm which makes the use of voice an easy low security interface (e.g., it is easy to be able to speak in order to remove your computer from screen lock decrypt files, voice dial, install software, etc.).

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A user recognition system for selectively permitting access by a requesting user to one of a service and facility, the system comprising:

means for extracting at least one biometric attribute from the requesting user;

means for storing previously extracted biometric attributes respectively corresponding to a pool of previously enrolled users;

means for identifying, from identifying indicia provided by the requesting user, a previously enrolled user as a claimed user;

means for associating, with the claimed user, first and second groups of previously enrolled users, the first group being defined as users who are respectively biometrically similar to the claimed user with respect to the extracted biometric attribute and the second group being defined as users who are biometrically similar to the claimed user but not as biometrically similar as the users in the first group; and means for verifying the requesting user by comparing the extracted biometric attribute of the requesting user to the pre-stored biometric attributes of the previously enrolled users in the second group and, in response to such comparison, generating an indicator indicating that the requesting user is one of verified and not verified for access to one of the service and facility.

2. The system of claim 1, wherein the biometric attributes are acoustic characteristics associated with the requesting user and the previously enrolled users.

3. A speaker recognition system for selectively permitting access by a requesting speaker to one of a service and facility, the system comprising:

means for computing at least one feature vector from a speech utterance provided by the requesting speaker;

means for pre-storing sets of acoustic features respectively corresponding to a pool of previously enrolled speakers;

means for identifying, from identifying indicia provided by the requesting speaker, a previously enrolled speaker as a claimed speaker;

means for associating, with the claimed speaker, first and second groups of previously enrolled speakers, the first group being defined as speakers who are respectively acoustically similar to the claimed speaker and the second group being defined as speakers who are acoustically similar to the claimed speaker but not as acoustically similar as the speakers in the first group; and means for verifying the requesting speaker by comparing the at least one feature vector of the requesting speaker to the pre-stored acoustic features of the previously enrolled speakers in the second group and, in response to such comparison, generating an indicator indicating that the requesting speaker is one of verified and not verified for access to one of the service and facility.

4. The system of claim 3, further comprising means for combining at least one of a password, a hardware key, an additional biometric measurement to generate an indicator indicating that the requesting speaker is one of verified and not verified for access to one of the service and facility.

5. The system of claim 3, further comprising means for decoding the speech utterance provided by the requesting speaker to generate a decoded request.

6. The system of claim 5, further comprising conditional access control means, responsive to the decoded request and the speaker verification indicator, for passing through the decoded request to another system responsive to the request, if the requesting speaker is verified.

7. The system of claim 5, further comprising conditional access control means, responsive to the decoded request and the speaker verification indicator, for executing the decoded request if the requesting speaker is verified.

8. The system of claim 3, wherein the pre-stored sets of acoustic features respectively corresponding to the pool of previously enrolled speakers are respectively stored in codebooks.

9. The system of claim 8, wherein the codebooks are respectively characterized by codewords which are characterized by means, variances and scores.

10. The system of claim 9, wherein acoustic similarity between speakers is determined by a distance measure between codewords of the codebooks respectively associated with the speakers.

11. The system of claim 3, wherein the identifying means further comprises means for inputting an identification code of the requesting speaker and comparing the code to identification codes of the previously enrolled speakers to identify the claimed speaker.

12. The system of claim 3, wherein the identifying means further comprises means for comparing the at least one feature vector of the requesting speaker to the pre-stored acoustic features of the previously enrolled speakers to identify the claimed speaker.

13. The system of claim 3, wherein the acoustic features are used to build acoustic models.

14. The system of claim 3, wherein the verification means comparison is relaxed during an enrollment phase so that a portion of the speakers in the first group are accepted and the speakers in the second group are rejected.

15. The system of claim 3, further comprising means for building background models from the pre-stored acoustic features of the previously enrolled speakers in the pool with the exception of the first group such that said background models are employed by the verifying means for comparison to the at least one feature vector associated with the requesting speaker.

16. The system of claim 3, wherein one of the service and facility to which access is selectively permitted includes a voice dialing system.

17. The system of claim 3, wherein one of the service and facility to which access is selectively permitted includes a computer software installation program.

18. The system of claim 3, wherein one of the service and facility to which access is selectively permitted includes execution of a computer program.

19. The system of claim 3, wherein one of the service and facility to which access is selectively permitted includes a computer file encryption program.

20. The system of claim 3, wherein one of the service and facility to which access is selectively permitted includes a computer display screen lock program.

21. The system of claim 3, wherein the first and second groups are formed substantially concurrent with the speaker requesting access to one of the service and facility.

22. A method for recognizing a speaker in order to selectively permit access by a requesting speaker to one of a service and facility, the method comprising the steps of:

(a) computing at least one feature vector from a speech utterance provided by the requesting speaker;

(b) pre-storing sets of acoustic features respectively corresponding to a pool of previously enrolled speakers;

(c) identifying, from identifying indicia provided by the requesting speaker, a previously enrolled speaker as a claimed speaker;

(d) associating, with the claimed speaker, first and second groups of previously enrolled speakers, the first group being defined as speakers who are respectively acoustically similar to the claimed speaker and the second group being defined as speakers who are acoustically similar to the claimed speaker but not as acoustically similar as the speakers in the first group; and (e) verifying the requesting speaker by comparing the at least one feature vector of the requesting speaker to the pre-stored acoustic features of the previously enrolled speakers in the second group and, in response to such comparison, generating an indicator indicating that the requesting speaker is one of verified and not verified for access to one of the service and facility.

23. The method of claim 22, further comprising the step of decoding the speech utterance provided by the requesting speaker to generate a decoded request.

24. The method of claim 23, further comprising the step of passing through the decoded request to another system responsive to the request, if the speaker is verified.

25. The method of claim 23, further comprising the step of executing the decoded request if the speaker is verified.

26. The method of claim 22, wherein the pre-stored sets of acoustic features respectively corresponding to the pool of previously enrolled speakers are respectively stored in codebooks.

27. The method of claim 26, wherein the codebooks are respectively characterized by codewords which are characterized by means, variances and scores.

28. The method of claim 27, wherein acoustic similarity between speakers is determined by a distance measure between codewords of the codebooks respectively associated with the speakers.

29. The method of claim 22, wherein the identifying step further comprises the step of inputting an identification code of the requesting speaker and comparing the code to identification codes of the previously enrolled speakers to identify the claimed speaker.

30. The method of claim 22, wherein the identifying step further comprises the step of comparing the at least one feature vector of the requesting speaker to the pre-stored acoustic features of the previously enrolled speakers to identify the claimed speaker.

31. The method of claim 22, wherein the acoustic features are used to build acoustic models.

32. The method of claim 22, wherein the verification comparison is relaxed during an enrollment phase so that a portion of the speakers in the first group are accepted and the speakers in the second group are rejected.

33. The method of claim 22, further comprising the step of building background models from the pre-stored acoustic features of the previously enrolled speakers in the pool with the exception of the first group such that said background models are employed in the verifying step for comparison to the at least one feature vector associated with the requesting speaker.

34. The method of claim 22, wherein the first and second groups are formed substantially concurrent with the speaker requesting access to one of the service and facility.

35. The method of claim 22, wherein one of the service and facility to which access is selectively permitted includes voice dialing system.

36. The method of claim 22, wherein one of the service and facility to which access is selectively permitted includes a computer software installation program.

37. The method of claim 22, wherein one of the service and facility to which access is selectively permitted includes a computer file encryption program.

38. The method of claim 22, wherein one of the service and facility to which access is selectively permitted includes a computer display screen lock program.

39. A speaker recognition system for selectively permitting access by a requesting speaker to one of a service and facility comprises:

an acoustic front-end for computing at least one feature vector from a speech utterance provided by the requesting speaker;

a speaker dependent codebook store for pre-storing sets of acoustic features, in the form of codebooks, respectively corresponding to a pool of previously enrolled speakers;

a speaker identifier/verifier module operatively coupled to the acoustic front-end, wherein:

the speaker identifier/verifier module identifies, from identifying indicia provided by the requesting speaker, a previously enrolled speaker as a claimed speaker;

the speaker identifier/verifier module associates, with the claimed speaker, first and second groups of previously enrolled speakers, the first group being defined as speakers whose codebooks are respectively acoustically similar to the claimed speaker and the second group being defined as speakers whose codebooks are acoustically similar to the claimed speaker but not as acoustically similar as the codebooks of the speakers in the first group; and the speaker identifier/verifier module verifies the requesting speaker by comparing the at least one feature vector of the requesting speaker to the codebooks of the previously enrolled speakers in the second group and, in response to such comparison, generates an indicator indicating that the requesting speaker is one of verified and not verified for access to one of the service and facility.

* * * * *